Patented May 7, 1940

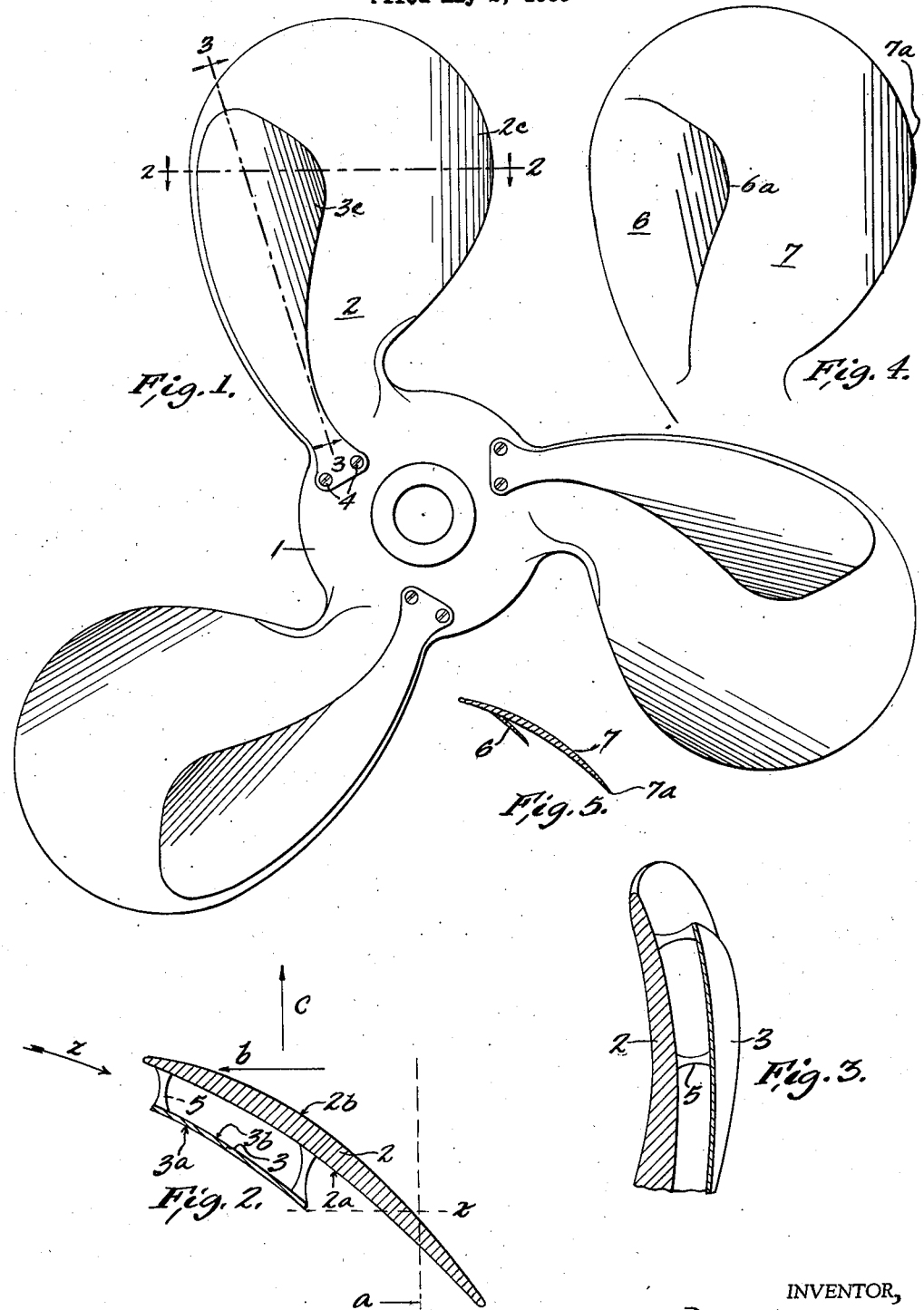

REISSUED
JUL 1 1940

NOV 26 1940

2,199,823

UNITED STATES PATENT OFFICE 2,199,823

PROPELLER

Peter Kessery, Hawthorne, N. J.

Application May 2, 1939, Serial No. 271,270

4 Claims. (Cl. 170—165)

The blades of a screw propeller are frequently formed with the rear face of each concave in cross-section and so arranged that the leading radially extending segment thereof approaches closer to parallelism with any plane perpendicular to the propeller axis than the remaining or trailing radially extending segment thereof, whereby there is materially less turbulence produced than if the blade for its entire width had the same angular relation to said plane and in consequence the power capable of being developed is increased.

Given a propeller of this general type, my object is to reduce the slip without increasing proportionately the turbulence incident to the operation of the propeller, whereby the propeller will of course be capable of developing superior power. This I accomplish by providing the propeller with main and auxiliary blades which are pitched bodily on the same hand (right or left) and to approximately the same degree relatively to the propeller axis and of which at least the auxiliary blade has the leading radially extending segment of its rear or acting face pitched less abruptly (or approaching nearer to parallelism with any plane perpendicular to said axis) than the remaining radially extending segment of such face, said auxiliary blade being abaft the main blade and having its width approximating half that of the main blade and its leading margin substantially coincident (viewing so much of the propeller as includes said blades from front to rear) with the leading edge of said main blade. Usually the rear faces of both blades will exist actually curved in cross-section. Preferably the trailing edge of the auxiliary blade is so formed and related to the main blade that a plane perpendicular to the propeller axis and made to coincide with such trailing edge at a point in substantially any circle concentric with said axis will cut the main blade; and preferably also the auxiliary blade extends radially outwardly short of the main blade. I have found in practical comparative tests of a propeller constructed in accordance with my invention and an identical propeller lacking any of said auxiliary blades and under identical speed and other conditions, that the former operates with materially less slip and hence greater power development than the latter. Such appears to be true even if the auxiliary blade does not extend radially short of the main blade. The reason for this is apparently as follows: In the rotation of the propeller the trailing segment of the main blade is left effective to exert the principal propelling effort, whereas such propelling effort as the leading segment of the main propeller exerts is augmented by the auxiliary blade whose leading segment stands related to its trailing segment substantially the same as the leading and trailing segments of the main blade. If the auxiliary blade is made to extend radially outwardly approximately as far as the main blade, especially if the trailing segment is proportionately so extended, I find that there is increased development of power without increase of speed in the same ratio, i. e., there is a disproportionate loss of speed.

In the drawing,

Fig. 1 is a rear or acting face view of a propeller constructed in accordance with this invention;

Figs. 2 and 3 are sections on lines 2—2 and 3—3, Fig. 1, respectively, the parts in Fig. 3 being viewed generally in the direction of arrow z in Fig. 2;

Fig. 4 is a view of a fragment of a propeller, showing a modification of the invention; and Fig. 5 is a cross section of the blade shown in Fig. 4.

In Figs. 1 to 3 let I be the hub and 2 the blades of a propeller of such standard form as is first herein referred to. The propeller shown is a marine propeller but so far as the following matters are concerned it might have the form of an aeroplane propeller and be used as such. The rear face 2a of each blade is pitched so that the trailing edge of the blade is abaft of its leading or left-hand edge in Fig. 2. But the pitch of the radially extending segment having as its left-hand margin the leading edge of the blade is less (that is, it approaches closer to any plane perpendicular to the axis of the propeller) than the remaining radially extending segment, said face being concave as shown in said figure. The forward face 2b will usually be convex, as shown. In this example (of a marine propeller) the trailing segment is developed with a trailing lobe portion 2c which defines the trailing edge of the blade.

The auxiliary blade, designated 3, stands spaced from and rearward of the corresponding main blade and it has its rear face 3a substantially parallel with that of such main blade, wherefore this face is characterized the same as the rear face of the main blade, that is, it is pitched the same and has, the same as the main blade, a leading radially extending segment which approaches more to parallelism with any plane perpendicular to the axis of the propeller than the remaining or trailing radially extending segment thereof. The auxiliary blade has approximately one-half the width of the main blade and is set so that it is squarely rearward, or substantially so, of the leading segment of the main blade and its trailing edge is so formed and related to the main blade that a plane perpendicular to the propeller axis and made to coincide with said trailing edge at a point in any circle concentric with said axis will cut the main blade, here and preferably on about the line $x$ well forward of the trailing edge of the main blade. Its front face 3b is here parallel with its face 3a. The contour of the auxiliary blade, viewed axially of the propeller, follows more or less that of the main blade, having its leading margin substantially parallel with that of the main blade and having a lobe 3c defining its trailing edge and which is radially displaced about the same as the lobe 2c of the main blade. The auxiliary blade, however, extends radially outward short of the end of the main blade.

Each auxiliary blade may be affixed to the rest of the structure in any way, as by screws 4 passed through its inner end and tapped into the hub, and posts 5, suitably positioned, and welded to the main and auxiliary blades.

Line $a$ in Fig. 2 is the axis of the propeller; arrows $b$ and $c$ respectively denote the direction of rotation of the propeller and the direction of travel of the boat or other vehicle propelled.

In the modification shown by Fig. 4, a propeller blade is shown which also embodies my invention. Here the blade of a standard propeller has a section 6 of its leading segment cut out and diverted rearwardly. Thus the leading margin of the auxiliary blade—the line at which it begins to be diverted from the main blade—is in approximate coincidence with the leading edge of the main blade.

It is not essential in all aspects of the invention that the main blades should have their rear faces formed as shown by the present example. For instance, such is immaterial to the advantage attained in having the trailing edge of the auxiliary blade terminate at a point in any circle concentric with the propeller axis which is in a plane cutting such main blade—the advantage that the portion of the main blade rearward of said plane is not eclipsed by the auxiliary blade; it is also immaterial to the advantage attained in forming the auxiliary blade so that it extends radially outwardly short of the main blade.

Having thus fully described my invention, what I claim is:

1. The herein described screw propeller including main and auxiliary blades existing pitched bodily on the same hand and to approximately the same degree relatively to the propeller axis and the auxiliary blade having the leading radially extending segment of its rear face pitched less abruptly than the remaining radially extending segment of such face, the auxiliary blade being abaft and having its width approximately one-half that of the main blade and having its leading margin substantially coincident with the leading edge of the main blade.

2. The propeller set forth in claim 1 characterized by the auxiliary blade extending radially short of the main blade.

3. The propeller set forth in claim 1 characterized by the trailing edge of the auxiliary blade being so formed and related to the main blade that a plane perpendicular to the propeller axis and made to coincide with such edge at a point in substantially any circle concentric with said axis will cut the main blade.

4. The propeller set forth in claim 1 characterized by the auxiliary blade extending short of the main blade and by the trailing edge of the auxiliary blade being so formed and related to the main blade that a plane perpendicular to the propeller axis and made to coincide with such edge at a point in substantially any circle concentric with said axis will cut the main blade.

PETER KESSERY.